(12) United States Patent
Goszyk

(10) Patent No.: US 7,671,844 B2
(45) Date of Patent: *Mar. 2, 2010

(54) PORTABLE ELECTRONIC REFERENCE DEVICE WITH PIVOTING LIGHT LID

(75) Inventor: Kurt Goszyk, Washington Crossing, PA (US)

(73) Assignee: Franklin Electronic Publishers, Inc., Burlington, NJ (US)

( * ) Notice: Subject to any disclaimer, the term of this patent is extended or adjusted under 35 U.S.C. 154(b) by 912 days.

This patent is subject to a terminal disclaimer.

(21) Appl. No.: 11/171,165

(22) Filed: Jun. 30, 2005

(65) Prior Publication Data

US 2007/0002024 A1 Jan. 4, 2007

(51) Int. Cl.
*G06F 3/02* (2006.01)
*G09G 5/00* (2006.01)
(52) U.S. Cl. ............... 345/168; 361/679.02; 362/98
(58) Field of Classification Search ......... 345/168–172; 361/680–681, 679.02–679.6; 362/98–99
See application file for complete search history.

(56) References Cited

U.S. PATENT DOCUMENTS

| 5,073,054 | A | * | 12/1991 | McDowell | 400/486 |
| 6,415,138 | B2 | * | 7/2002 | Sirola et al. | 455/90.1 |
| 6,567,137 | B1 | * | 5/2003 | Moon | 349/61 |
| 6,819,549 | B1 | * | 11/2004 | Lammers-Meis et al. | 361/681 |
| 7,099,149 | B2 | * | 8/2006 | Krieger et al. | 361/681 |

* cited by examiner

*Primary Examiner*—Amr Awad
*Assistant Examiner*—Michael Pervan
(74) *Attorney, Agent, or Firm*—Cowan, Liebowitz & Latman

(57) ABSTRACT

A portable electronic reference device is disclosed that can be used by a user when reading a book. The electronic reference device functions as a dictionary for the reader to look up words as they read. It can also have various other functions that would be suitable for a portable electronic device. The device has a display section and a keyboard section. A pivoting transparent lid is provided on the display. The lid also contains a light to allow a user to clearly see the device and pages of a book.

4 Claims, 10 Drawing Sheets

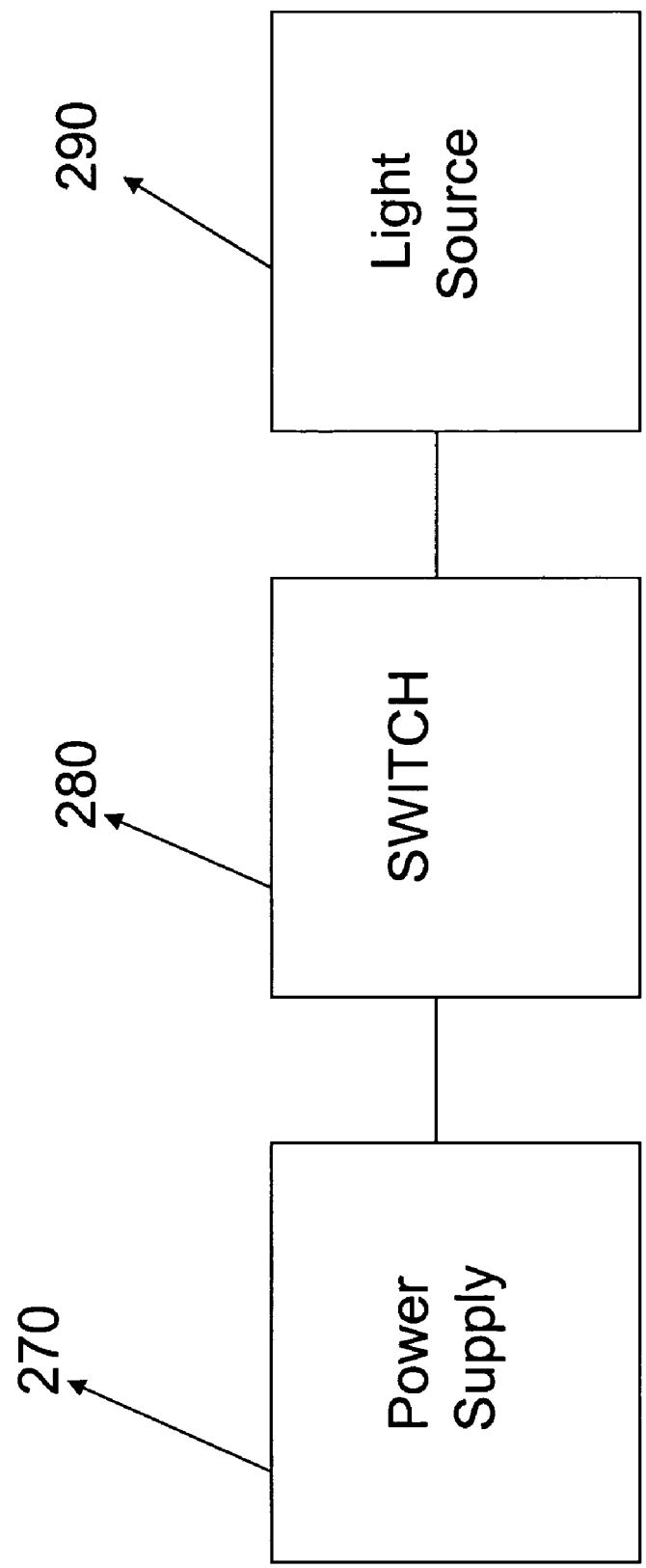

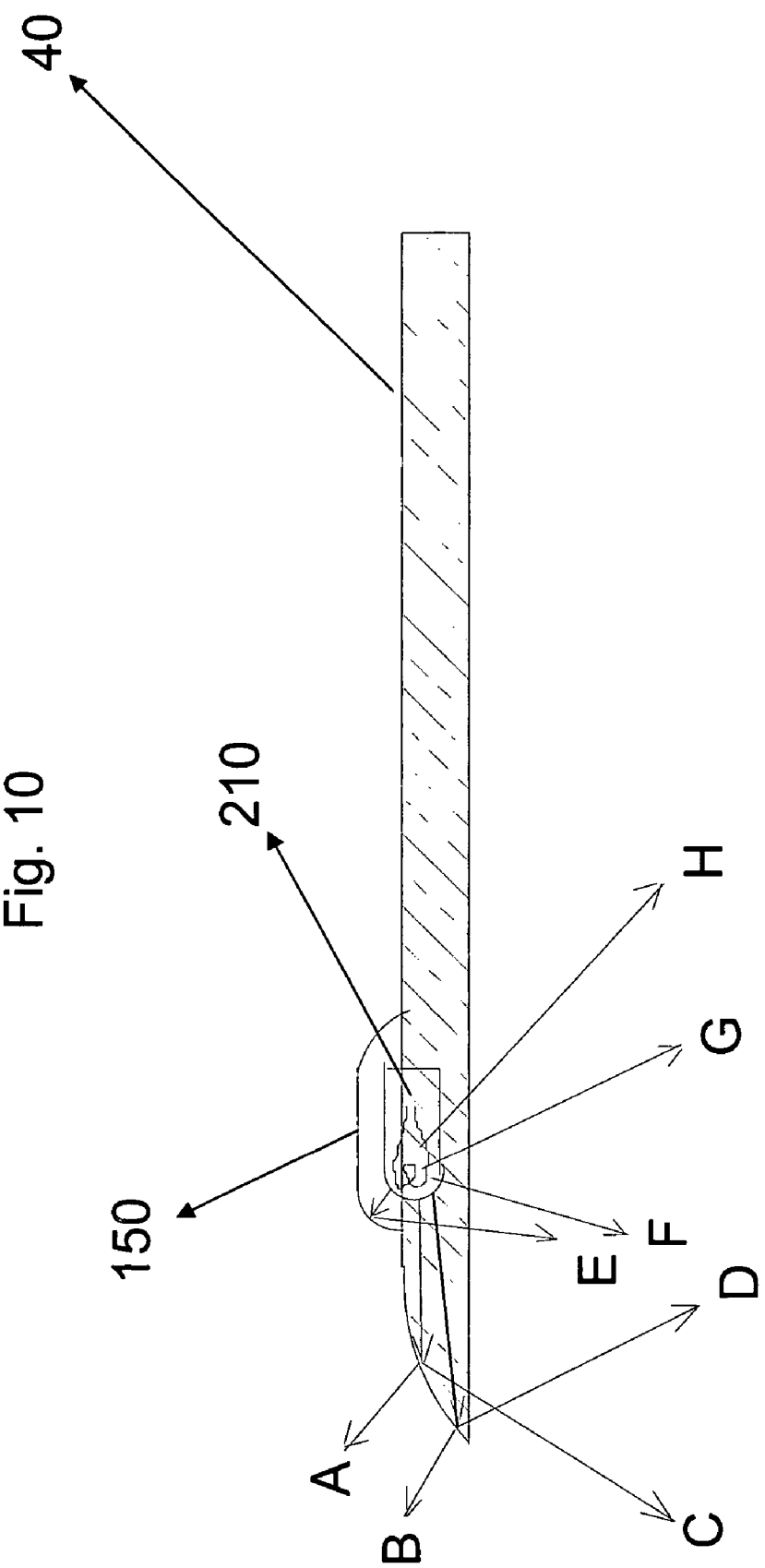

PORTABLE ELECTRONIC REFERENCE DEVICE WITH PIVOTING LIGHT LID

BACKGROUND

A. Field of Invention

This invention relates to a portable electronic device that can be used as a reference guide by a person reading a book. More particularly, the invention relates to a device that can be easily carried within the book and serve as a bookmark and provides a reading light.

B. Description of the Related Art

Certain electronic reference devices have been designed to be used when reading a book. A dictionary is one such device, useful when reading a book. These devices can also be proportionately sized so as to be able to fit inside a book so that it is readily accessible to the user while reading the book. These devices can also be of an appropriate weight so as to be carried with the book. It is important that these devices are of suitable size and weight not to cause damage to the pages of the book nor to the binding of the book.

Another device that can be used when reading a book is a book light. Such devices are portable lights sources, such as a small light bulb, that are intended to allow a reader to read in a dark room by illuminating the page of the book being read. The light source is typically partially covered so that the light will only shine in one direction. This directional lighting allows the reader to focus the light onto the page of the book that is being read without illuminating the rest of the room to disturb anyone else in the room. Such types of book lights are capable of being adjusted so that the directional light can be focused onto the page, however, that focusing typically creates a "spotlight" effect wherein the light brightly illuminates one spot on the page and the rest of the page is not as equally illuminated.

There is a need for a bookmark that can provide the features of a dictionary and other such applications and be efficient and easy to use. There is also a need for a bookmark to provide a reading light so that a user does not have to turn on a much brighter light to read. There is also a need to provide a book mark having a reading light so that a user may more clearly see the display on the bookmark as well as the words on the page of the book.

SUMMARY OF THE INVENTION

The current invention involves a portable electronic reference device that is capable of being inserted in between pages of a book and used as a bookmark without causing damage to the pages of the book or causing damage to the device itself. According to one aspect of the invention, the portable electronic reference device has a keyboard section and a display section. A light is attached to the lid and is operable to provide lighting. A switch is also provided to automatically turn on the light in the light compartment when the lid moves from a closed position to an open position.

BRIEF DESCRIPTION OF THE DRAWINGS

The accompanying drawings are included to provide an understanding of the invention and constitute a part of the specification.

FIG. 9 illustrates a block schematic of the switch connection according to the present invention.

FIG. 10 illustrates the directional transmission of light according to the present invention.

DESCRIPTION OF THE INVENTION

Figure 1:
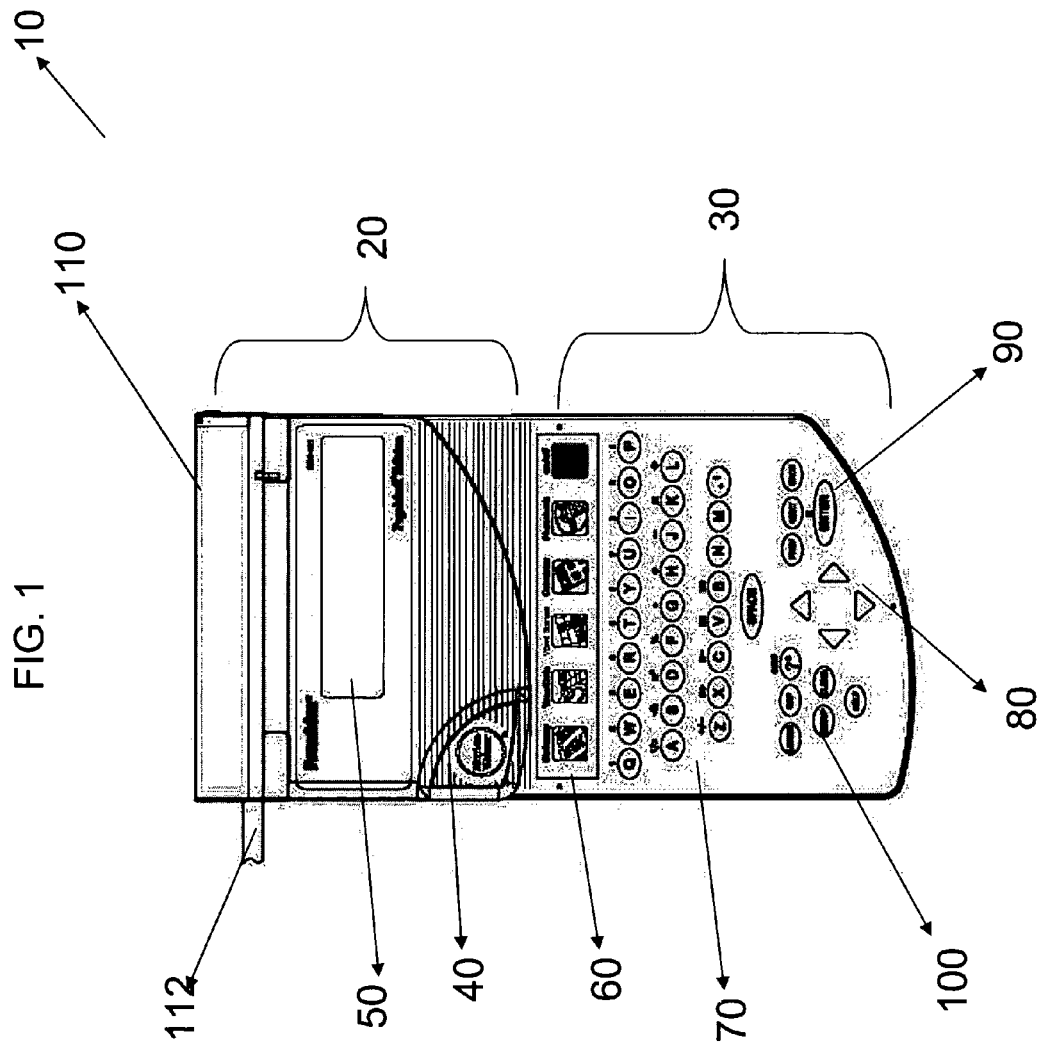
FIG. 1 illustrates the front view of the portable electronic reference device.

FIG. 1 depicts the front view of the portable electronic bookmark device 10. In the device 10 there is a display section 20, a keyboard section 30 and a lid 40. Above the keyboard section 30 is the display section 20. The display section 20 has a screen 50 to display data to the user. In one embodiment of the present invention, the display screen is an LCD screen, but it can be any screen suitable to displaying graphics and/or text to the user.

The device 10 can be extremely thin because the battery unit 110 is positioned on the upper part of the device. The thickness of the device is uniform for both the display section 20 and the keyboard section 30. As such, the entire main body of the device 10 will easily fit in between two pages of a closed book without causing any damage to the pages or to the binding of the book. The device can then act as a bookmark to designate the relevant page for the user. In addition, by having the entire device within the book, the display section and the flexible keyboard section are protected by the book.

The keyboard section 30 has various keys that allow the user to input data into the book mark 10. In one embodiment of the present invention, the book mark 10 has six menu keys 60 that allow the user to select different modes of operation for the device. As shown in this embodiment, the six modes are (1) dictionary, (2) time/date, (3) word games, (4) calculator, and (5) phonebook and (6) ON/OFF switch. Each mode allows the user to access different functions of the device. The number and type of keys can vary depending on the type and purpose of the device.

The keyboard section 30 also has a set of alphabetic keys 70. The user can use these keys to type in words to be processed by the device. Below the alphabetic keyboard, there is a set of four keys corresponding to the four directional arrows 80. These keys can be used by the user to navigate through different menus displayed on the screen. Next to the directional arrows 80 are a set of keys 90 marked as (1) prev, (2) next, (3) back, and (4) enter. These keys are also available to allow the user to navigate various software menus displayed on the screen. To the left of the directional keys 80 are six miscellaneous keys 100.

In a dictionary mode, the user will be able to enter a word to look up. Upon typing the word using the keyboard and pressing the enter key, the device 10 will display the definition of the word. If the word is misspelled, then the device will display a list of words that are the potential word.

If the user selects the time/date key from the menu keys, the device 10 will display the current time and date. The user can change the date and time by using the keys in the lower left hand side of the device.

If the user selects the word games key from the menu keys, the screen will display various word games that the user can use. Word games available in one embodiment include (a) hangman, (b) Jumble, (c) anagrams, and (d) tic tac toe. The user can use the directional arrow keys 80 located directly below the alphabetic keys 70 to select the appropriate game.

If the user selects the calculator key from the menu keys 60, the device will allow the user to perform various arithmetic functions. In the calculator mode of operation, the alphabetic keys 111 will now be used to input numbers and the arithmetic functions. The numeric values and arithmetic functions are printed above each corresponding key.

If the user selects the databank key from the menu keys, the device 10 allows the user to build a user list of words and store them in the device's memory. This user list can be used in conjunction with the games operating mode.

The keyboard section 30 is primarily composed of a thin flexible PC circuit board. The portion of the flexible PC circuit board that is in the keyboard section is covered with a thin vinyl laminate. The keys on the keyboard section 30 are printed onto the laminate and do not rise above the surface of the laminate. The vinyl laminate is pliable so that a user pressing on the keys will be able to create an electrical connection in the circuit board below the laminate to register that key being pressed with the processor.

Above display section 20, there is provided a battery housing 110. The battery housing 110 is provided to contain batteries that will supply power to the lid 40. The battery housing 110 is cylindrical and is capable of holding at least two triple A batteries. A ribbon 112 extends from the batter housing 110. The ribbon 112 can be used to mark specific pages in a book. The battery housing 110 will be discussed in greater detail with reference to FIG. 6.

Figure 2:
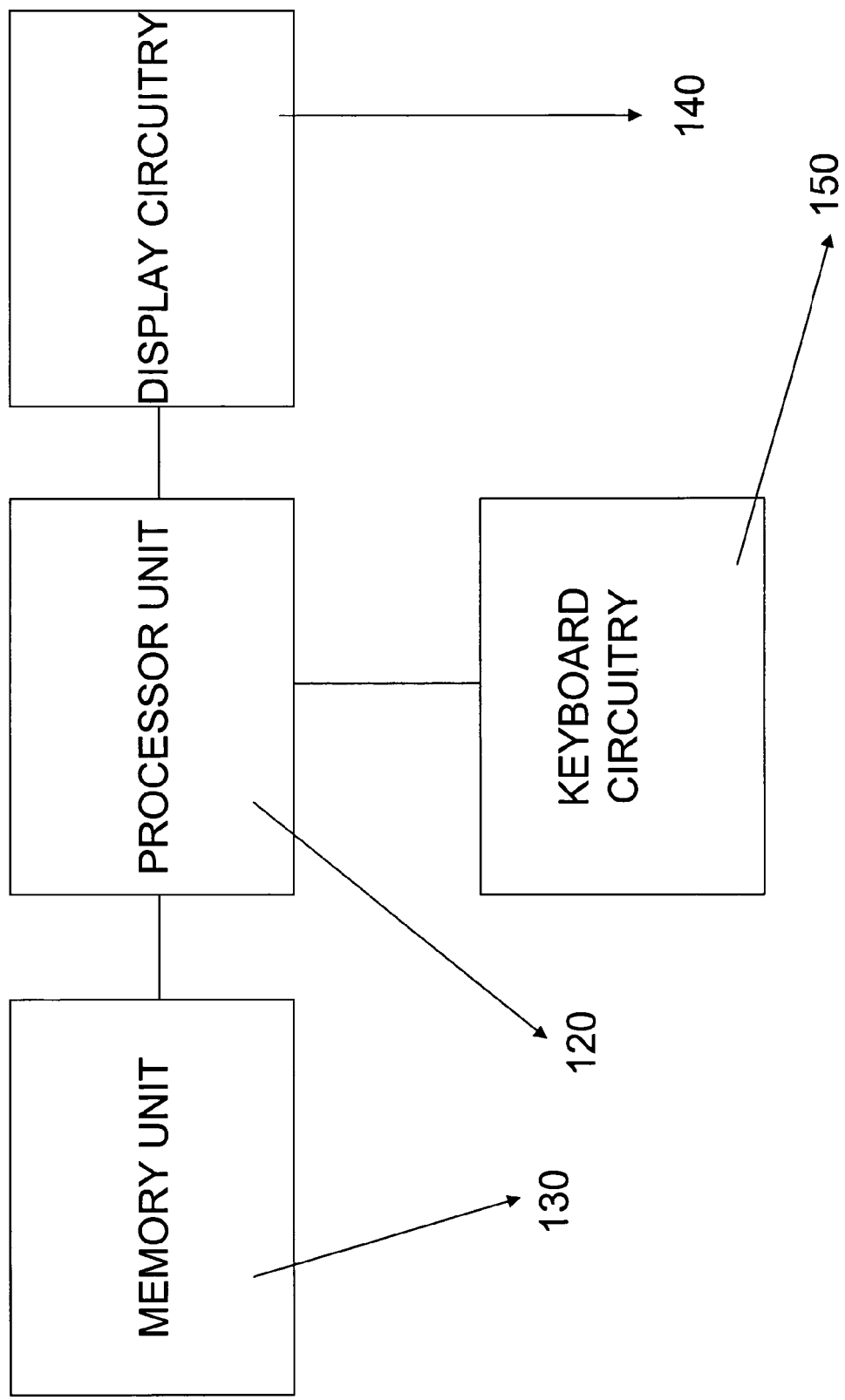
FIG. 2 depicts a schematic diagram of the components of the present invention.

FIG. 2 details a schematic diagram showing the electrical components of one embodiment of the present invention. It can be seen that a processor unit 120 is electrically connected to a memory unit 130, display circuitry 140 and keyboard circuit 150. The processor 120 is typically located in the display section 20. The processor 130 can be any microprocessor that is capable of being programmed to perform the various functions required by the device. The memory unit 130 acts as the main storage area for data entered by the user. The memory unit 130 can be comprised of memory chips that are permanently located within the apparatus. It can also include an external memory unit that is temporarily connected to the device. Other circuits, such as a sound unit, can be added to the device without changing the teachings of this invention.

Figure 3:
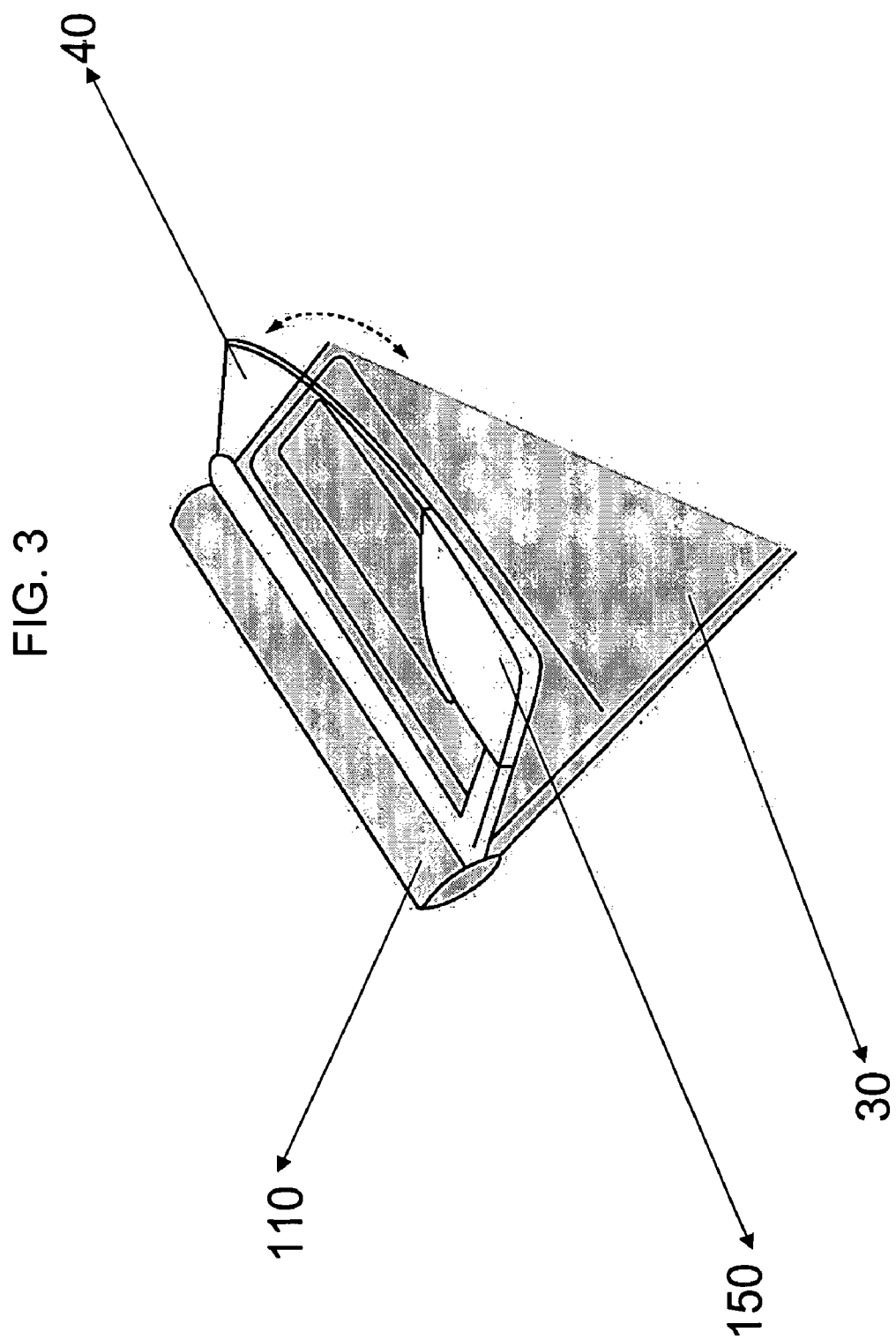
FIG. 3 shows a more detailed illustration of the display section and lid of the present invention.

FIG. 3 is a more detailed view of the display section 20 and the lid 40. The lid 40 is transparent and in one embodiment is a Plexiglas structure. Although, in the present embodiment the lid is constructed with Plexiglas material, any material providing durability and transparency may be utilized. The lid 40, in one embodiment, has a first side and a second side opposite the first side. The first side is pivotally connected to the display section 20 of the device 10. The second side as shown in FIG. 3 is curved. The lid 40 is provided with a light compartment 150. The lid 40 and light compartment 150 will be discussed in greater detail with reference to FIG. 6.

Figure 4:
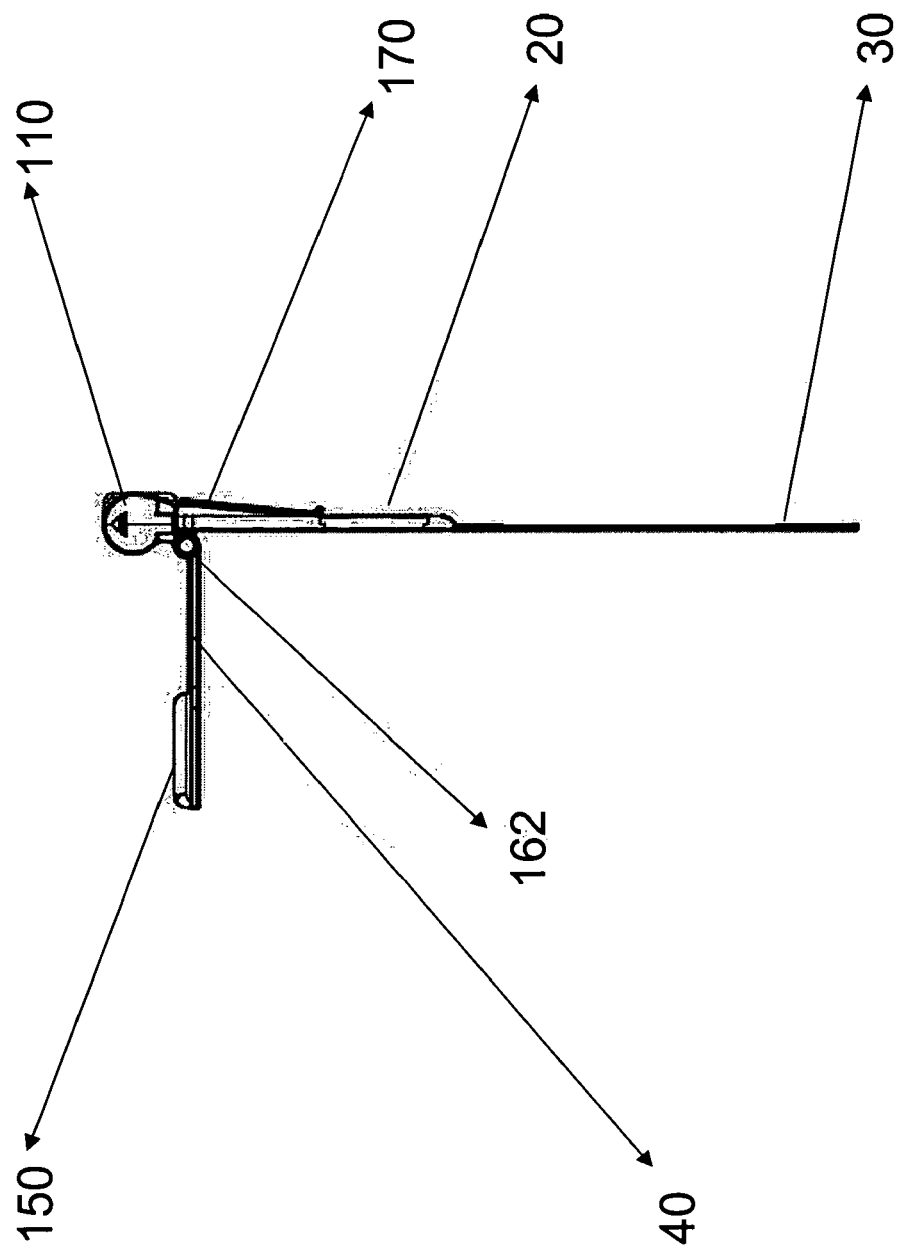
FIG. 4 illustrates a side view of the present invention with the lid is in an open position.
Figure 5:
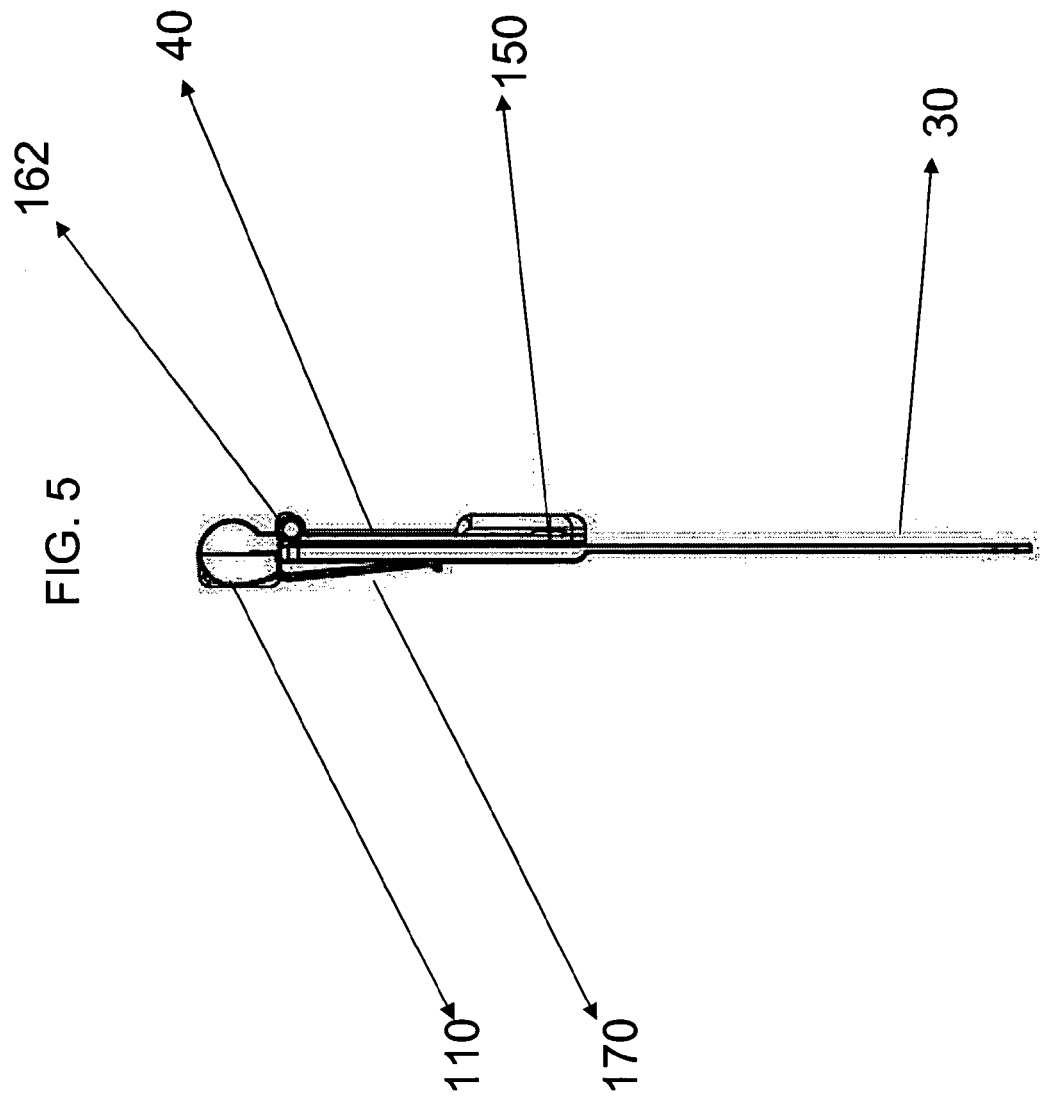
FIG. 5 depicts the side view of the present invention when the lid is in a closed position.

FIGS. 4 and 5 illustrate side views depicting the positioning of the lid 40 in an open and closed state. FIG. 4 illustrates a side view of the device 10 when the lid 40 is in an open position. The lid 40, as mentioned above, is pivotally connected to display section 20. More specifically, the lid 40 is connected to a hinge 162.

Also, a clip 170 is positioned on the back portion of the device 10. The clip 170 can be used to clip the device onto the cover of a book. The ribbon 112 (not shown) then may be used to mark a specific page in the book. FIG. 5 illustrates the device 10 when the lid 40 is in a closed position. When the lid 40 is placed flat against the display section 10, a user is capable of viewing the display screen through the lid 40.

Figure 6:
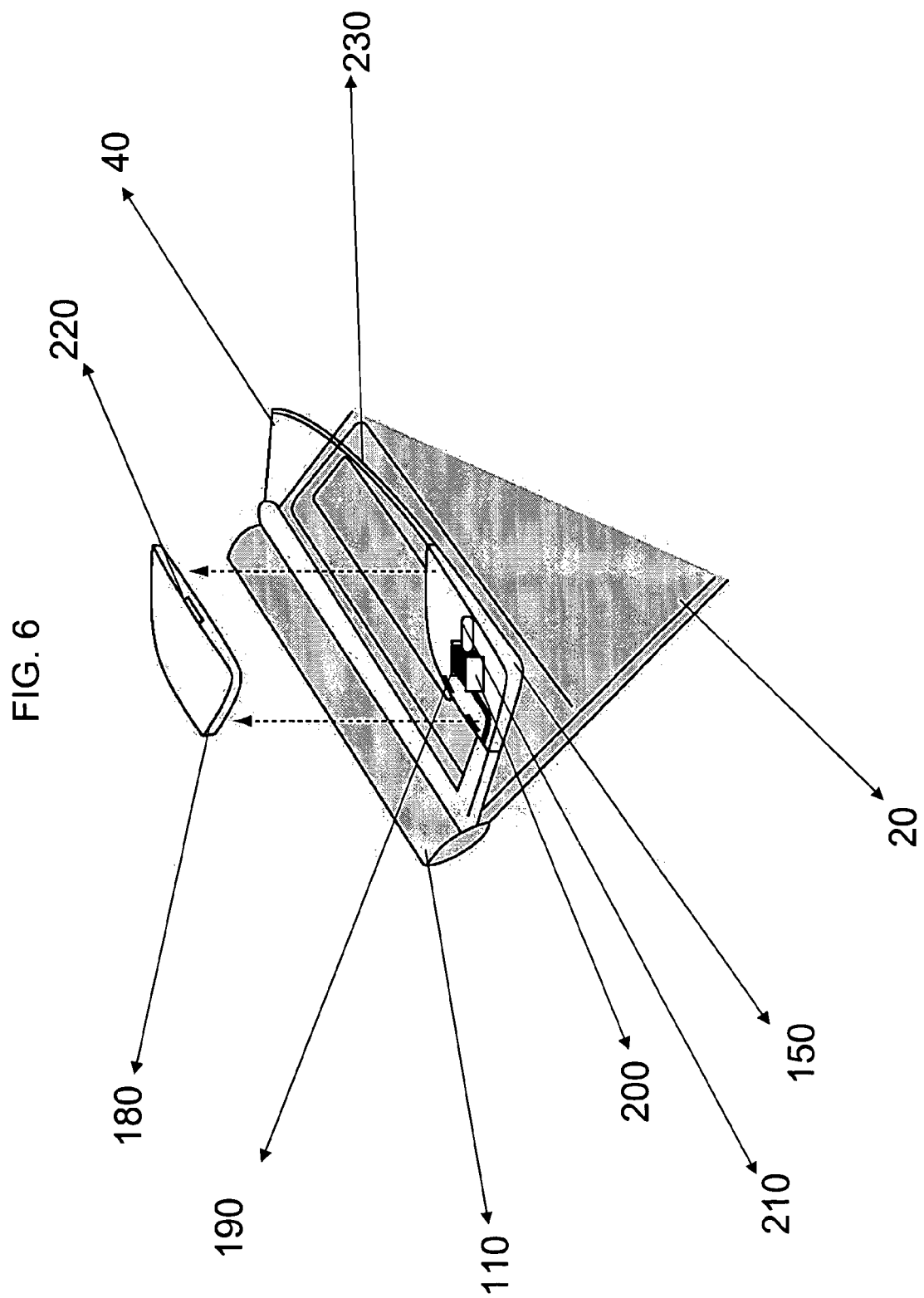
FIG. 6 illustrates the light compartment provided in the lid of the present invention.

Now turning to FIG. 6, the structure of the light compartment and operation of the light with respect to the movement of the lid 40 will be explained. FIG. 6 illustrates the lid 40 and light compartment 150 in more detail. The light compartment 150 is provided with a detachable lid 180, light socket 190, light clip 200, and light bulb 210. The electrical circuitry of the light compartment 150 and the lid 40 are provided so that when the lid 40 is moved from the closed position to the open position, the light bulb in the light compartment is powered on, providing illumination of the device 10. Generally, the light bulb is powered on when the lid 40 is moved to position greater than 45 degrees from the closed position. When the lid 40 is "closed" or placed over the display section 20, the light is turned off. More specifically, the light bulb 210 is powered off when the lid 40 is less than 45 degrees or greater than 100 degrees. A switch is provided within a hinge that enables the light to be turned on and off depending on the positioning of the lid 40. The switch will be discussed in greater detail with reference to FIG. 9.

The detachable lid 180 is secured to the light compartment 150 by a latch 220. The detachable lid 180 can be removed by applying pressure and pushing upward on the latch 220. The inner side of the detachable lid 170 is provided with reflective material so that the light will reflect in one direction—away from the reflective surface.

The lid also has a curved section 230 on the second side of the lid. The curved section 230 of the lid 40 acts in conjunction with the location of the lid and the reflective surface to allow a portion of the light to shine out of (refract) the curved section of the lid and a portion be reflected down toward the book pages. Specifically, since the light bulb 210 is positioned so that that the illumination from the light bulb 210 is directed towards the curved section 230 of the lid, part of the light is able to be reflected off of the curved section 230 of the lid 40 towards the book. As a result, the reflection of the illumination from the reflection sheet and the refraction of the light from the curved section 230 of the lid 40 provides greater, more uniform and directed illumination. More importantly, this creates a type of halo where the light from the lid emanates directly from the light source and also from the entire curved edge of the lid. In addition, the light compartment 150 is positioned on the left hand side of the device so that when the bookmark is placed on the right hand side of an open book, the light is closer to the center of the open book and the illumination of the light bulb will shine on both pages of the open book.

Figure 7:
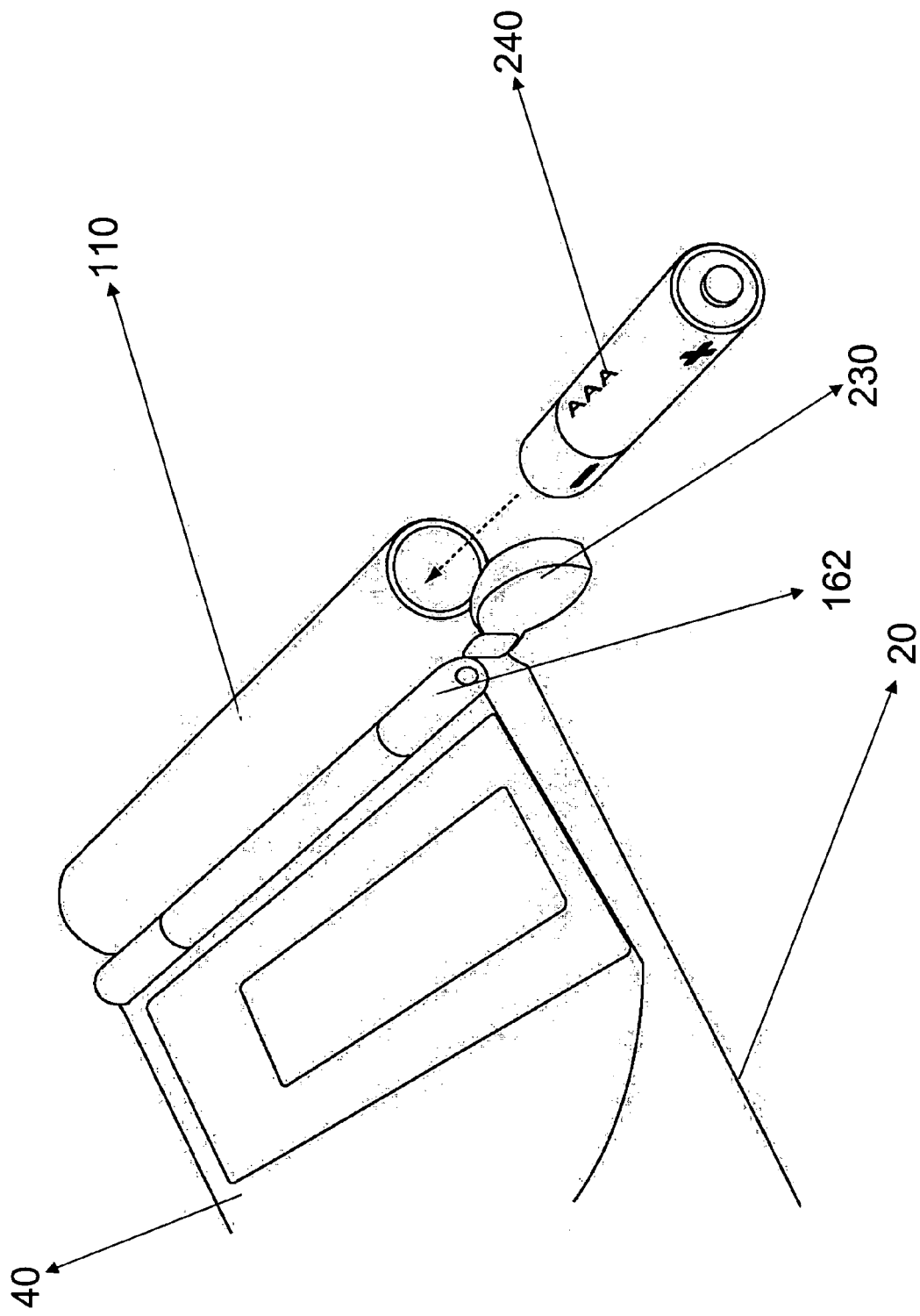
FIG. 7 illustrates a battery housing for the present invention.

FIG. 7 illustrates the battery housing 110 in more detail. The battery housing 110 is located at the top portion of the display section 20. The battery housing 110 is shown having a pivoted opening 230. As mentioned above, a triple A battery 240 is provided in the battery housing 110 to power the light compartment 150 of the device 10. Although one triple A battery 240 is illustrated, the present device operates utilizing two triple A batteries. The lid 40 is also illustrated attached to the hinge 162.

Figure 8:
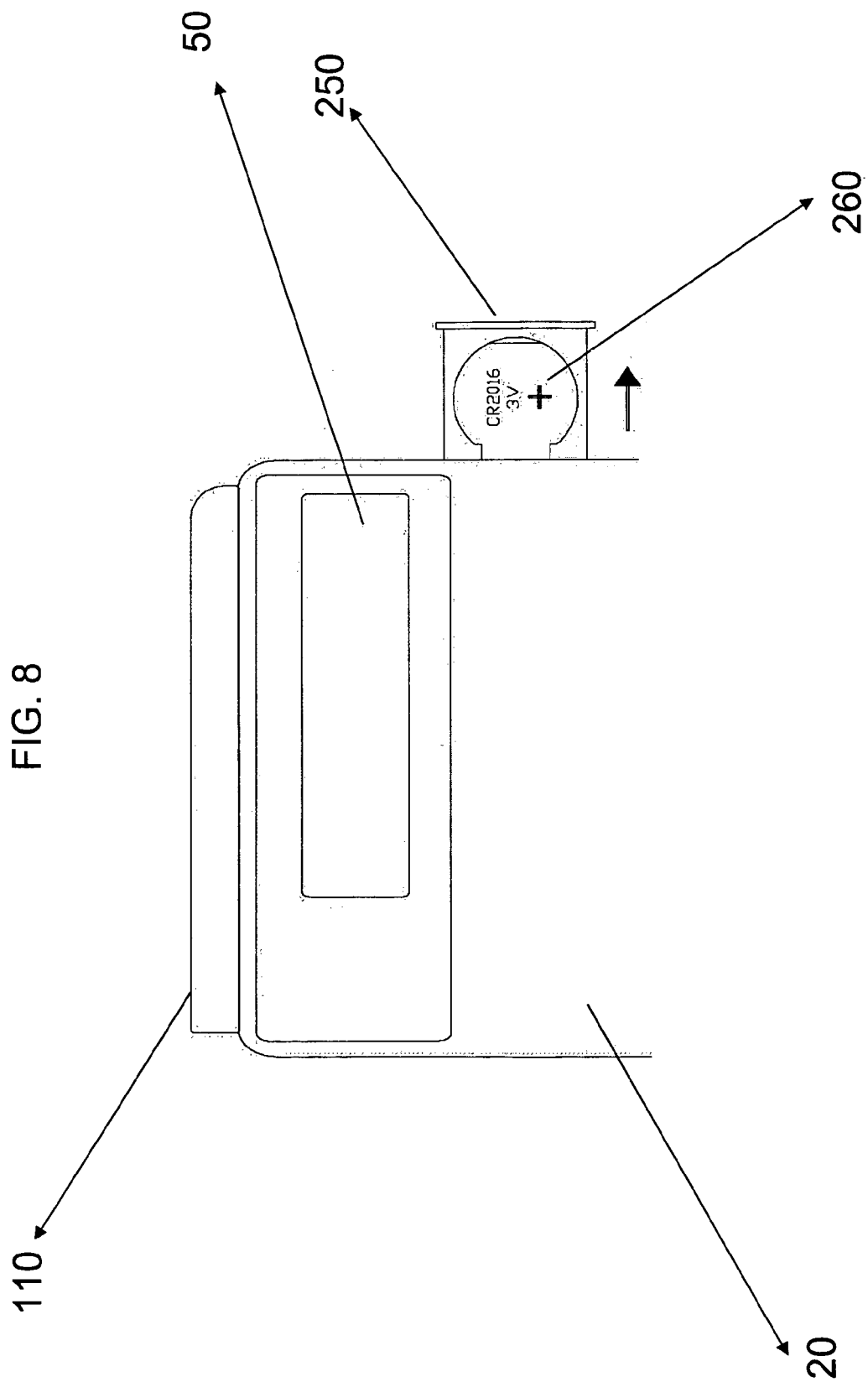
FIG. 8 illustrates a battery compartment for providing power to the keyboard section of the present invention.

FIG. 8 illustrates a battery compartment 250 for providing power to the display and keyboard section. The battery compartment is constructed in the display section 20 and is capable of sliding in and out from below the display section 20. The battery compartment 250 is provided to supply power to the electronic circuitry of the display and keyboard section 30. When the battery compartment is laterally moved into the device 10, electrical components of the keyboard section are connected to the battery and provided power. A CR2016 lithium 3 v battery is shown as a power source.

FIG. 9 shows a schematic of the electrical components of the device connected to the light compartment 150. A power supply 270 is connected to a switch 280. The switch 280 when switched supplies power to a light source 290 thereby illuminating the light compartment 150. The power supply 270 is provided by battery 240 from the battery housing 110. The switch 280 is provided in the hinge 162 and is connected electrically to the light compartment 150. The switch allows power to the light source automatically when the lid moves from a closed position to an open position.

FIG. 10 illustrates the directional transmission of light according to the present invention. As shown in FIG. 10, directional arrows A-H illustrate the direction the light is transmitted when the lid 40 is in an open position and the light bulb 210 is powered on. The light is transmitted toward curved edges A, B, C, D, E of the lid 40 as well as through the lid 40 F, G, H. As a result, the light is refracted A, B, reflected C, D, E and transmitted through the lid F, G, H to the book (not shown). The transmission of the light in this manner produces the halo effect on the pages of the book. Accordingly, the pages of the book are provided with greater illumination.

The present invention is not to be considered limited in scope by the preferred embodiments described in the specification. Additional advantages and modifications, which readily occur to those skilled in the art from consideration and specification and practice of this invention are intended to be within the scope and spirit of the following claims:

We claim:

1. A portable electronic reference and illumination device having a keyboard, display and processor thin enough to fit between pages of a closed book, comprising:
    a lid having first and second opposed edges and third and fourth connecting edges,
    said second edge being curved, whereby said third edge is longer than said fourth edge,
    said first edge being pivotally connected to said display,
    said lid having a transparent section that provides an unobstructed view of said display when said lid is closed;
    a light compartment positioned adjacent the juncture between said second and third edges, said light compartment adapted to contain a light source,
    said light compartment containing a reflective surface,
    said light source positioned to provide light along said curved second edge,
    a switch operable to turn on the light source when the lid moves from a closed position to an open position to provide illumination, said illumination having first, second and third components,
    said first component being direct illumination from said light source,
    said second component being reflected light from said reflective surface, and
    said third component being refracted light from the curved second edge of said lid.

2. The device of claim 1 further comprising:
    a first battery compartment for use with a battery to power the light source, said first battery compartment positioned outboard of said first edge, and
    a second battery compartment for use with a battery to power the display and keyboard, said second battery compartment slidable within one of the display and keyboard between an inboard operating position and an outboard battery replacement position.

3. The device of claim 1 wherein said third component of said illumination provides a halo effect.

4. The device of claim 2 wherein said third component of said illumination provides a halo effect.

* * * * *